(12) United States Patent
Blanc Tailleur et al.

(10) Patent No.: US 11,473,325 B2
(45) Date of Patent: *Oct. 18, 2022

(54) SWIMMING POOL CLEANING DEVICE INCLUDING A REMOVABLE FILTER DEVICE

(71) Applicant: Zodiac Pool Care Europe, Bron (FR)

(72) Inventors: Philippe Blanc Tailleur, Toulouse (FR); Faustine Munoz, Venissieux (FR); Philippe Pichon, Villeneuve de Riviere (FR)

(73) Assignee: ZODIAC POOL CARE EUROPE, Belberaud (FR)

( * ) Notice: Subject to any disclaimer, the term of this patent is extended or adjusted under 35 U.S.C. 154(b) by 0 days.

This patent is subject to a terminal disclaimer.

(21) Appl. No.: 17/147,360

(22) Filed: Jan. 12, 2021

(65) Prior Publication Data

US 2021/0131132 A1 May 6, 2021

Related U.S. Application Data

(63) Continuation of application No. 16/576,693, filed on Sep. 19, 2019, now Pat. No. 10,914,092, which is a (Continued)

(30) Foreign Application Priority Data

Apr. 4, 2014 (FR) ...................... 1453023

(51) Int. Cl.
*E04H 4/16* (2006.01)
*C02F 1/00* (2006.01)
(Continued)

(52) U.S. Cl.
CPC .......... *E04H 4/1654* (2013.01); *C02F 1/001* (2013.01); *E04H 4/1209* (2013.01); *E04H 4/1609* (2013.01); *C02F 2103/42* (2013.01)

(58) Field of Classification Search
CPC ... E04H 4/1654; E04H 4/1209; E04H 4/1609; C02F 1/001; C02F 2103/42
(Continued)

(56) References Cited

U.S. PATENT DOCUMENTS 3,080,060 A 3/1963 Blumenkranz et al.
5,045,194 A 9/1991 Gershenson
(Continued)

FOREIGN PATENT DOCUMENTS

AU 2004205090 3/2005
AU 2015242487 1/2020
(Continued)

OTHER PUBLICATIONS

Australian Application No. 2015242487, First Examination Report dated Oct. 22, 2018, 3 pages.
(Continued)

*Primary Examiner* — Fred Prince
(74) *Attorney, Agent, or Firm* — Kilpatrick Townsend & Stockton LLP

(57) ABSTRACT

Swimming pool cleaning apparatus may include a cleaning unit intended to be immersed in a swimming pool and at least one liquid filter circuit between at least one liquid inlet and at least one liquid outlet via a filter chamber removable from the body of the cleaning unit. The filter chamber may include a cover and a filter basket. The cover may include components for fastening the filter basket and locking the filter chamber to the body of the cleaning unit. The locking component may be releasable and, when released, may cause an extraction handle to be deployed from the filter chamber and urged toward a predetermined position.

3 Claims, 6 Drawing Sheets

Related U.S. Application Data continuation of application No. 15/797,174, filed on Oct. 30, 2017, now Pat. No. 10,443,258, which is a continuation of application No. 14/440,475, filed as application No. PCT/FR2015/050868 on Apr. 2, 2015, now Pat. No. 9,809,989.

(51) Int. Cl.
*E04H 4/12* (2006.01)
*C02F 103/42* (2006.01)

(58) Field of Classification Search
USPC .......... 210/167.16, 167.17, 232, 238; 15/1.7
See application file for complete search history.

(56) References Cited

U.S. PATENT DOCUMENTS

| | | | |
|---|---|---|---|
| 5,379,506 A | 1/1995 | Park | |
| 5,385,666 A | 1/1995 | Perlsweig et al. | |
| 5,941,586 A | 8/1999 | Fann | |
| 7,467,730 B2 | 12/2008 | Manke et al. | |
| 7,537,691 B2 | 5/2009 | Reid | |
| 7,640,624 B2 | 1/2010 | Crouch et al. | |
| 7,661,381 B2 | 2/2010 | Gorelik et al. | |
| 7,837,875 B2 | 11/2010 | Callaert et al. | |
| 8,168,065 B1 | 5/2012 | Gavigan et al. | |
| 8,343,339 B2 | 1/2013 | Sumonthee | |
| 8,550,269 B2 | 10/2013 | Lane | |
| 8,615,836 B2 * | 12/2013 | Pichon | E04H 4/1654 15/1.7 |
| 8,728,313 B2 | 5/2014 | Swain | |
| 9,809,989 B2 | 11/2017 | Blanc Tailleur et al. | |
| 10,443,258 B2 | 10/2019 | Blanc Tailleur et al. | |
| 10,914,092 B2 | 2/2021 | Blanc Tailleur et al. | |
| 2002/0104790 A1 | 8/2002 | Lincke | |
| 2005/0262652 A1 | 12/2005 | Sumonthee | |
| 2006/0002759 A1 | 1/2006 | Blackman et al. | |
| 2006/0016047 A1 | 1/2006 | Blackman et al. | |
| 2011/0005009 A1 | 1/2011 | Pichon et al. | |
| 2012/0103365 A1 * | 5/2012 | Sumonthee | E04H 4/1654 134/18 |
| 2013/0061407 A1 | 3/2013 | Ben-Dov et al. | |
| 2014/0008311 A1 | 1/2014 | Weston et al. | |
| 2014/0137891 A1 | 5/2014 | Hanan et al. | |

FOREIGN PATENT DOCUMENTS

| | | |
|---|---|---|
| EP | 1905925 | 4/2008 |
| EP | 2116673 | 11/2009 |
| EP | 2235291 | 10/2010 |
| EP | 2235291 | 10/2011 |
| EP | 2116673 | 3/2013 |
| EP | 3126594 | 8/2019 |
| FR | 2925551 | 1/2010 |
| FR | 2925557 | 9/2013 |
| FR | 3019575 | 11/2016 |
| WO | 0250388 | 6/2002 |
| WO | 2009081040 | 7/2009 |
| WO | 2010003247 | 1/2010 |
| ZA | 201606795 | 10/2018 |

OTHER PUBLICATIONS

Canadian Application No. 2,944,719, Office Action dated Apr. 20, 2021, 3 pages.
Canadian Application No. 2,944,719, Notice of Allowance dated Dec. 2, 2021, 1 page.
Hercules Power-Rated 6000, Watertech Corp., Available online at: http://web.archive.org/web/20120322080933/http://watertechcorp/products-Hercules-6000.htm, Mar. 22, 2012, 1 page.
Rapids 4wd, Aquabot, Available online at: https:/web.archive.org/web/20130502222829/http://www.aquabot.com/residential, May 2, 2013, 1 page.
U.S. Appl. No. 14/440,475, Non-Final Office Action, dated Aug. 26, 2016, 6 pages.
U.S. Appl. No. 14/440,475, Notice of Allowance, dated Feb. 17, 2017, 10 pages.
U.S. Appl. No. 14/440,475, Notice of Allowance, dated Jul. 5, 2017, 11 pages.
U.S. Appl. No. 15/797,174, Ex-Parte Quayle Action, dated May 16, 2019, 5 pages.
U.S. Appl. No. 15/797,174, Non-Final Office Action, dated Dec. 12, 2018, 9 pages.
U.S. Appl. No. 15/797,174, Notice of Allowance, dated Aug. 22, 2019, 7 pages.
U.S. Appl. No. 16/576,693, Notice of Allowance, dated Jun. 24, 2020, 17 pages.
U.S. Appl. No. 16/576,693, Notice of Allowance, dated Oct. 21, 2020, 9 pages.
Australia Application No. 2015242487, Notice of Acceptance, dated Aug. 28, 2019, 3 pages.
European Application No. 15719795.5, Notice of Decision to Grant, dated Aug. 1, 2019, 2 pages.
France Application No. 1453023, Notice of Decision to Grant, dated Sep. 13, 2016, 1 page.
France Application No. 1453023, Office Action, dated Sep. 19, 2016, 2 pages.
France Application No. 1453023, Preliminary Search Report, dated Dec. 2, 2014, 7 pages.
International Application No. PCT/FR2015/050868, International Preliminary Report on Patentability, dated Oct. 13, 2016, 14 pages.
International Application No. PCT/FR2015/050868, International Search Report and Written Opinion, dated Jul. 9, 2015, 17 pages.

* cited by examiner

ND FILTER
SWIMMING POOL CLEANING DEVICE INCLUDING A REMOVABLE FILTER DEVICE

CROSS REFERENCE TO RELATED APPLICATIONS

This application is a continuation of U.S. patent application Ser. No. 16/576,693, filed on Sep. 19, 2019, which is a continuation of U.S. patent application Ser. No. 15/797,174, filed on Oct. 30, 2017, which is a continuation of U.S. patent application Ser. No. 14/440,475, filed on May 4, 2015, which is a U.S. national phase under 35 U.S.C. § 371 of International Patent Application No. PCT/FR2015/050868, filed on Apr. 2, 2015, which claims priority to French Patent Application No. 14/53023 filed on Apr. 4, 2014, the entire contents of each of which are incorporated herein by reference.

The present invention relates to swimming pool equipment. It more particularly concerns swimming pool cleaning apparatus including a device for cleaning the filter without the user having to soil their hands.

PREAMBLE AND PRIOR ART

The invention concerns apparatus for cleaning a surface immersed in a liquid, such as a surface formed by the walls of a pool, notably of a swimming pool. It is notably a question of a mobile swimming pool cleaning robot. Such a cleaning robot performs said cleaning by travelling over the bottom and the walls of the swimming pool, brushing those walls, and aspirating the debris toward a filter. Debris means all the particles present in the pool, such as fragments of leaves, micro-algae, etc., this debris normally being deposited on the bottom of the pool or stuck to the lateral walls thereof.

The robot is most usually supplied with power by an electrical cable connecting the robot to an external control and power supply unit.

There are known, for example, in this field, the Applicant's patents FR 2 925 557 and 2 925 551 that are directed to immersed surface cleaning apparatus including a removable filter device. Such devices comprise a body, members for driving said body over the immersed surface, a filter chamber in the body and including a liquid inlet, a liquid outlet, a liquid circulation hydraulic circuit between the inlet and the outlet via a filter device. In these two patents, the filter device is removable to enable emptying out of the leaves and other debris without having to turn over the cleaning apparatus.

This apparatus includes automatic programs for cleaning the bottom of the pool and possibly the lateral walls of the pool. Such a program determines cleaning of the swimming pool in a predetermined time, for example one and a half hours. The robot is generally removed from the water by the user at the end of the cycle or at regular intervals, when the filter is too full of particles (leaves, micro-particles, etc.), to clean it. In recent designs, the external control and power supply unit of the robot emits a luminous signal when this operation of cleaning the filter must be carried out.

In most modern swimming pool cleaning robot designs, cleaning the filter obliges the user to remove the filter from the robot and then to empty it and to wash it in plenty of water. These operations most often bring the user into contact with the filter sludge, which is disagreeable and not very hygienic.

A notable object of the invention is to remedy some of these drawbacks.

The invention is also directed to swimming pool cleaning apparatus where cleaning the filter is greatly simplified.

The invention is also directed to swimming pool cleaning apparatus in which the consumption of energy is low.

SUMMARY OF THE INVENTION

A first aspect of the invention consists in swimming pool cleaning apparatus comprising:
  a. a handle that is able to move between a first position and a second position;
  b. means for retaining the handle in the first position, and
  c. means for urging the handle towards the second position.

Here "swimming pool cleaning apparatus" refers to apparatus for cleaning an immersed surface, i.e. typically apparatus mobile in or on the bottom of a swimming pool and adapted to collect and filter debris deposited on a wall. Such apparatus is commonly known as a swimming pool cleaning robot when it includes means for automatic management of movement over the bottom and the walls of the swimming pool to cover all of the surface to be cleaned.

By an abuse of language, here "liquid" refers to the mixture of water and debris in suspension in the swimming pool or in the fluid circulation circuit in the cleaning apparatus.

The handle is advantageously fixed directly or indirectly to the upper part of the body.

In one particular embodiment the apparatus comprises a body having an upper part that includes a recess such that, in the first position, at least a part of the handle fits into said recess.

As a result, the hydrodynamic profile of the cleaning apparatus is improved when the handle is retained in the first position and the apparatus therefore consumes less energy in order to move.

Moreover, in this position, a user cannot pull on the handle, which makes it possible to prevent untimely extraction, for example removal of the debris filter when the cleaning unit is operating.

In one particular embodiment the means for retaining are designed to be moved manually so as to release the handle from the first position.

In another embodiment, possibly used in conjunction and intended to reduce the risk of inappropriate use, the means for retaining include automatic locking means responsive to the status of the cleaning unit.

In one particular embodiment the handle rotates through about ninety degrees from the first position to the second position. As a result, said handle becomes perfectly easy to grasp in the hand and the force to remove the filter is perpendicular to the initial plane of the handle.

In one particular embodiment the swimming pool cleaning apparatus further includes a body and a debris filter, at least a part of the debris filter being positioned in a chamber of the body when the cleaning unit is in use and the filter basket being removable from the housing in the body of the cleaning unit by pulling on the handle when the handle is in the second position. This embodiment corresponds to the use of such a retractable handle for inserting and removing the debris filter.

In this case, in one particular embodiment when the handle is retained in the first position, the filter basket is fixed inside the chamber, and when the handle is in the second position, the filter basket is released from the chamber.

In one particular embodiment the handle extends approximately along the width of the body.

The means for urging comprise at least one spring, for example a torsion spring.

The cleaning apparatus advantageously comprises (a) a body, (b) means for moving the body in a swimming pool, and (c) a motor for driving the movement means.

In another aspect the invention consists in swimming pool cleaning apparatus comprising:
 a. a body;
 b. a debris filter, at least a part of which is disposed inside the body;
 c. an indicator, mobile from a first position to a second position, the indicator being visible from outside the body when it is in the second position, and
 d. means for urging the indicator towards the second position when the debris filter contains a predetermined quantity of debris.

In another aspect the invention consists in swimming pool cleaning apparatus comprising:
 a cleaning unit intended to be immersed in the swimming pool,
 at least one liquid filter circuit between at least one liquid inlet and at least one liquid outlet via a filter chamber removable from the body of the cleaning unit.

The cleaning unit advantageously comprises:
 means for forcing a flow of water between the water inlet and the water outlet via the filter circuit,
 means for controlling movements of the cleaning unit.

The filter circuit comprises at least one filter chamber removable from the body of the cleaning unit, comprising:
 a cover,
 a filter basket.

The cover includes releasable means for fastening the filter basket and means for locking the filter chamber to the body of the cleaning unit. These means for locking are releasable and, when released, i.e. in practice when the filter is dirty, cause an extraction handle to be deployed from the filter chamber and urged towards a predetermined position.

As a result, when the user wishes to remove the filter basket from the swimming pool cleaning apparatus, they do not need to soil their hands through contact with leaves or debris contained in the filter basket.

The filter basket and the cover are advantageously removed from the apparatus by upward removal out of the body of the cleaning unit.

In this way, the filter basket is removable through the top of the apparatus. Thus a user does not need to turn over said apparatus to remove the filter basket. The cover therefore forms an upper part of the body of the apparatus.

The invention also concerns immersed surface cleaning apparatus characterized in combination by some or all of the features referred to above or hereinafter.

DESCRIPTION OF THE FIGURES

The features and advantages of the invention will be better appreciated thanks to the following description, which describes the features of the invention by means of a nonlimiting application example.

The description refers to the appended figures, in which.

DETAILED DESCRIPTION OF ONE EMBODIMENT OF THE INVENTION

The invention finds its application in a swimming pool technical environment, for example a family type swimming pool set in the ground.

In the present nonlimiting embodiment, immersed surface cleaning apparatus includes a cleaning unit, referred to hereinafter as a swimming pool cleaning robot, and a power supply and control unit of said swimming pool cleaning robot.

Figure 1:
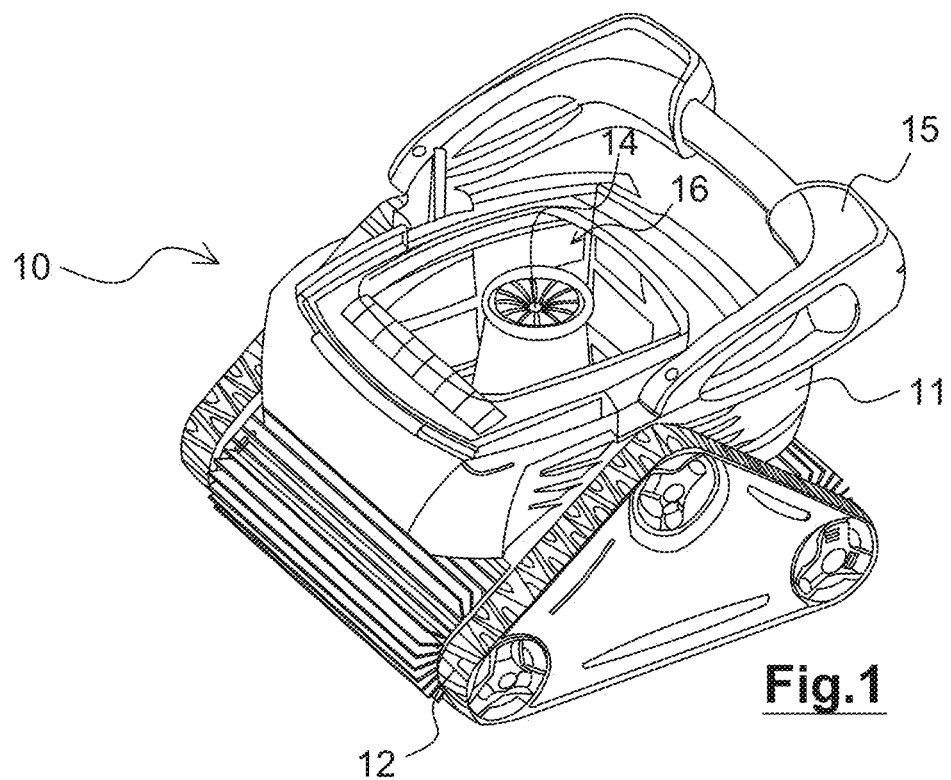
FIG. 1 is a perspective view of swimming pool cleaning apparatus employing a filter system as described.
Figure 2:
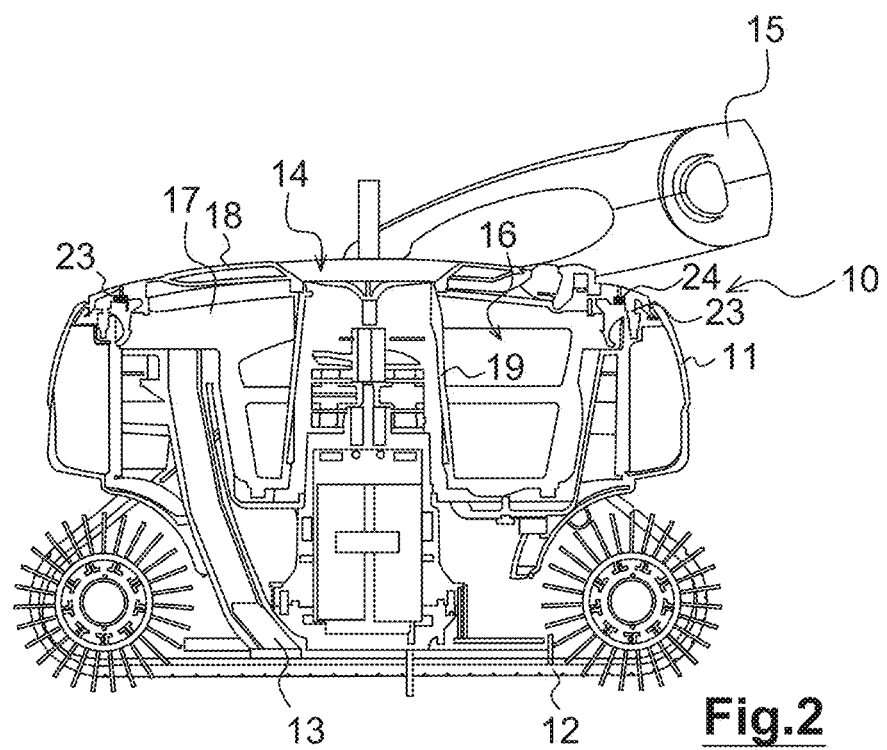
FIG. 2 is a view of the same apparatus in section on a vertical longitudinal plane.

The embodiment of the cleaning unit shown in FIGS. 1 and 2 is shown here by way of example.

The swimming pool cleaning robot 10 comprises a body 11 and a drive and guide device comprising members 12 for driving and guiding the body on an immersed surface. In the present nonlimiting embodiment, these drive and guiding members consist of wheels or caterpillar tracks disposed laterally of the body (see FIG. 1).

The swimming pool cleaning robot 10 further comprises a motor driving said drive and guide members, said motor being powered in the present embodiment via an onboard circuit card.

For the remainder of the description there is defined a frame of reference $X_r, Y_r, Z_r$ relating to this cleaning robot 10, in which:
 a longitudinal axis $X_r$ is defined as the axis of movement of the cleaning robot 10 when the movement wheels 12 are driven identically,
 a transverse axis $Y_r$ is defined as perpendicular to the longitudinal axis $X_r$ and situated in a plane parallel to the bearing plane of the movement wheels 12 of the cleaning robot 10, this lateral axis $Y_r$ therefore being parallel to the rotation axis of the wheels,
 a vertical axis $Z_r$ is defined as perpendicular to the other two axes.

The concepts of front, rear, left, right, top, bottom, upper, lower, etc. in relation to the cleaning robot are defined relative to this frame of reference $X_r, Y_r, Z_r$.

The swimming pool cleaning robot 10 includes a water filter circuit including at least one liquid inlet 13 and one liquid outlet 14. In the present nonlimiting embodiment the liquid inlet 13 is situated at the base of the body 11 (in other words under the latter when the swimming pool cleaning robot 10 is placed in its normal operating position on the bottom of the swimming pool), that is to say immediately facing an immersed surface over which the swimming pool cleaning robot 10 moves in order to be able to aspirate debris accumulated on said immersed surface. The liquid outlet 14 is situated on top of the swimming pool cleaning robot 10. In the present embodiment, the liquid outlet 14 is in a direction approximately perpendicular to the guide plane, i.e. vertical if the swimming pool cleaning robot 10 is resting on the bottom of the swimming pool.

The water filter circuit connects the liquid inlet 13 to the liquid outlet 14. The water filter circuit is adapted to be able to produce a flow of liquid from the liquid inlet 13 to the liquid outlet 14. To this end the swimming pool cleaning robot 10 includes a pump comprising a motor and an axial-flow impeller, said motor driving the axial-flow impeller in rotation, said axial-flow impeller being disposed in the hydraulic circuit.

The swimming pool cleaning robot 10 is supplied with energy by means of a watertight flexible cable. In the present embodiment, this flexible cable is attached to the top of the body of the swimming pool cleaning robot 10. This flexible cable is connected at its other end to the power supply unit (not shown in FIG. 1) disposed externally of the pool, this power supply unit being itself connected to the electrical mains supply.

In the present embodiment, the cleaning robot 10 further includes a holding handle 15 adapted to enable a user to remove the robot from the water, notably when the filter must be cleaned. In the present embodiment, the holding handle 15 is mobile between a deployed position and a position folded against the body of the cleaning unit.

In a variant of this embodiment, a return spring of the torsion spring type is disposed on the axis of the holding handle 15 and urges the holding handle towards its folded-away position. In this way, the hydrodynamic resistance of the cleaning unit when moving in water is low and the electrical consumption of the apparatus is therefore low.

In one particular embodiment the cleaning robot includes means enabling rapid emptying of the water contained in its internal filter chamber when it is removed from the water. Such devices are described for example in the Applicant's patent application EP2235291.

The swimming pool cleaning robot 10 comprises a filter chamber 16 in the water filter circuit between the liquid inlet 13 and the liquid outlet 14. The filter chamber is in particular fed with liquid via at least one upstream channel connecting the liquid inlet 13 to the filter chamber 8. Each upstream channel opens into the filter chamber 16 via a feed opening. Here the feed opening is fitted with a check valve.

Figure 3:
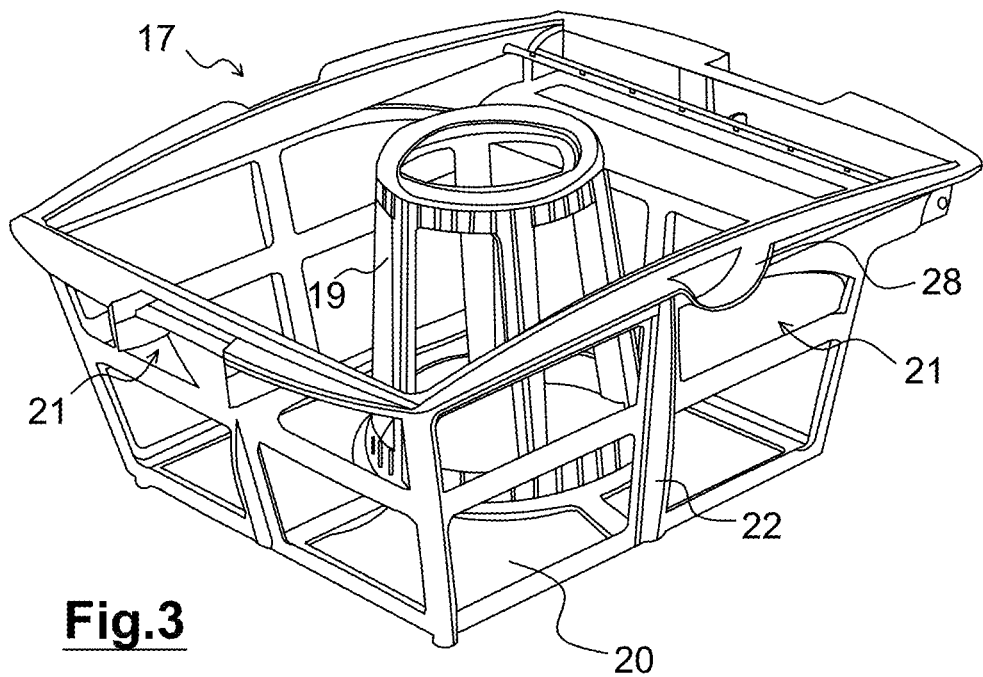
FIGS. 3 and 4 are perspective views of a filter basket fitted to the apparatus from FIG. 1,
 FIGS. 5 and 6 are perspective views of a filter basket fitted to the apparatus from FIG. 1 with a cover including a handle for removing it in a deployed position.
Figure 4:
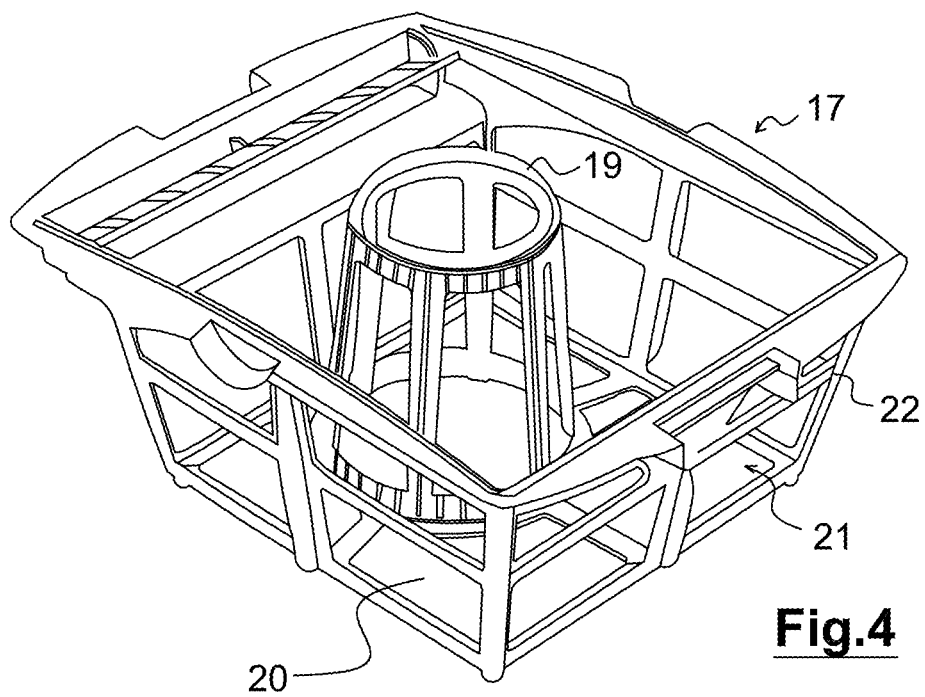
Figure 5:
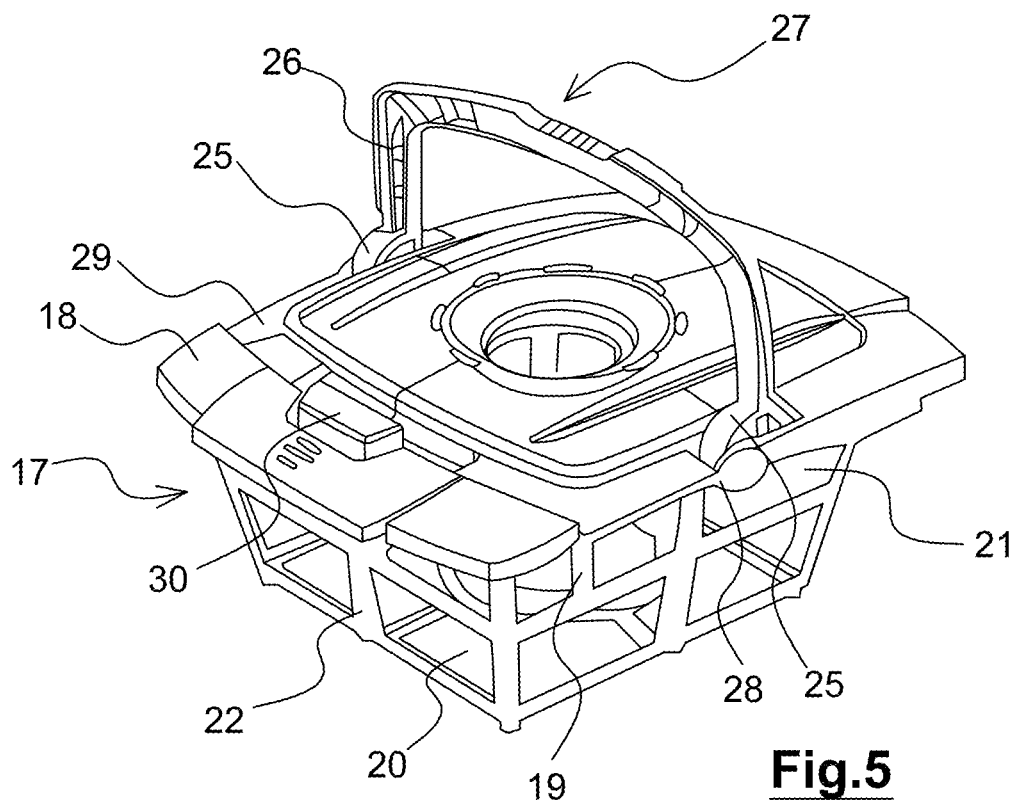
Figure 6:
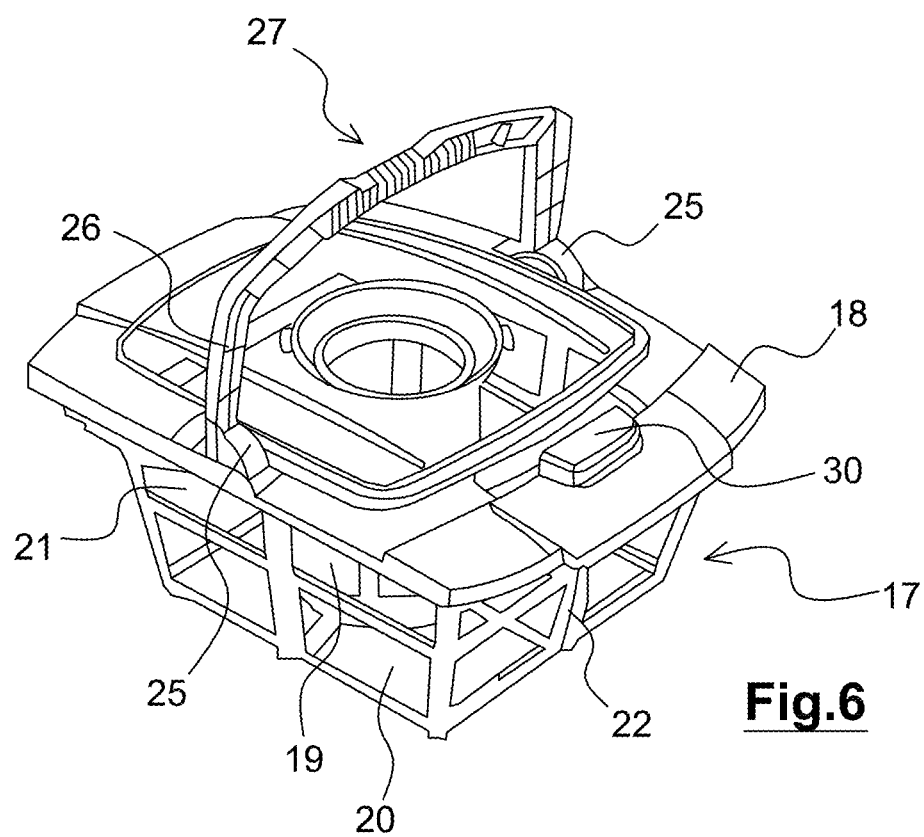

In the present embodiment, the filter chamber 16 comprises a filter basket 17 notably shown in FIGS. 3 and 4 and a cover 18 notably shown in FIGS. 5 and 6, forming the upper wall of the filter chamber 16 and forming an integral part of the exterior surface of the body 11 of the cleaning unit 10. This removable cover 18 enables a user to access the filter basket 17 in the filter chamber 16 to clean the filter when this proves necessary.

Here the filter basket 17 forms the bottom and the inner and outer peripheral walls of the filter chamber 16.

In one particular embodiment the axial-flow impeller driving the flow of water in the filter circuit is disposed along a vertical axis that is approximately centrally located in the body 11 of the cleaning unit. In this case the liquid outlet 14 is situated in the middle of the cover 18. In this embodiment the central part of the filter basket 17 includes a central filter wall 19 surrounding a cowling of the axial-flow impeller.

Figure 7:
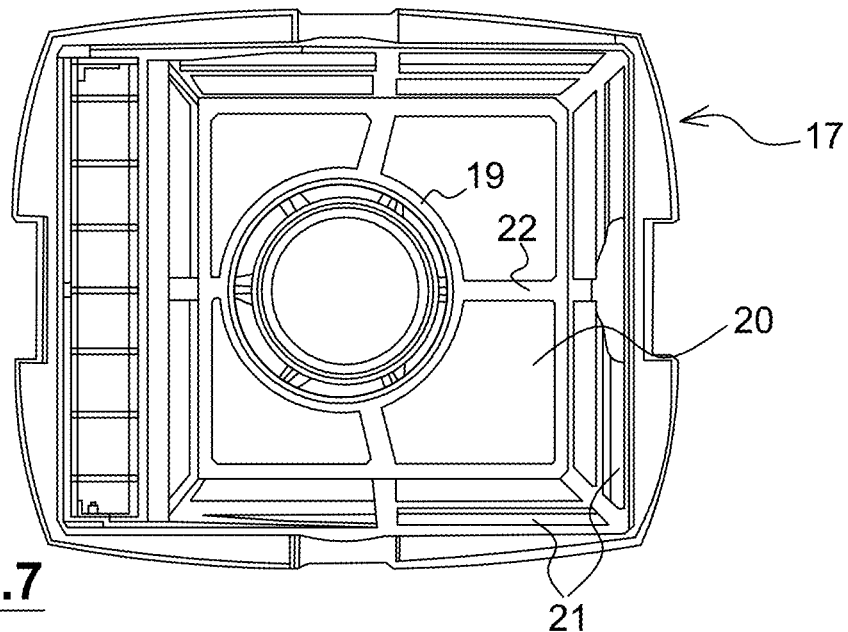
FIGS. 7 and 8 are diagrammatic plan views of the same basket with and without the cover.
Figure 9:
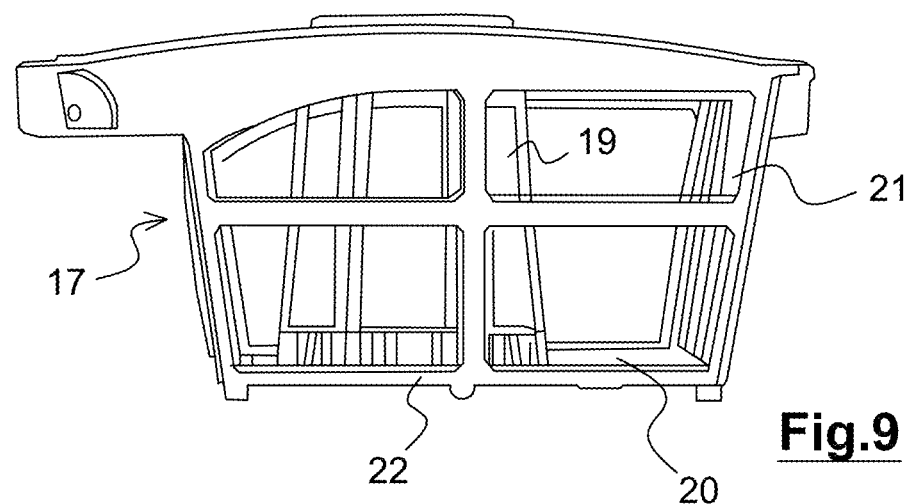
FIGS. 9 and 10 are side views of the same filter basket with and without the cover.

In the nonlimiting embodiment shown in FIGS. 7 and 9, the filter basket 17 then has a parallelepipedal overall shape with an opening through it formed by the central filter wall, intended to be placed around the cowling of the axial-flow impeller and the electric motor. In addition to the central filter wall 19, the filter basket 17 includes a lower filter wall 20 and external lateral filter walls 21, thus being conformed as a rectangular parallelepiped with no top face, said face normally being formed by the cover 18, the central part of said filter basket 17 including the central filter wall 19 oriented along an axis perpendicular to its lower face 20, this axis coinciding here with the vertical axis $Z_r$ of the cleaning unit 10. In the present embodiment the central filter wall 19 is of frustoconical shape, wider at the bottom than at the top (near the cover 18).

In the present nonlimiting embodiment the filter basket 17 includes a fine-mesh surface forming the filter as such, welded, glued or attached by other means to a perforated rigid armature 22.

The filter chamber 16 is removable, i.e. it can be removed from and inserted in the body 11 of the apparatus. To this end the body 11 of the apparatus includes a housing into which the filter basket 17 can be inserted, the cover 18 establishing continuity with the exterior surface of the body 11 of the apparatus. The fact that the filter basket 17 is removable makes it easy to empty, notably without having to manipulate the entire cleaning unit.

The filter basket 17 is removably fastened to the cover 18 in order to facilitate cleaning the filter basket 17 of debris accumulated therein.

The cover 18 is hermetically sealed to the filter basket 17 in order to prevent leaking of liquid charged with debris. In one nonlimiting embodiment the cover 18 includes a peripheral ring adapted to cooperate with an edge of the filter basket. As a result, debris remains inside the filter basket 17. In a variant embodiment, the cover 18 includes a peripheral seal (not shown in the figures) that comes to bear on the edge of the filter basket 17.

Figure 10:
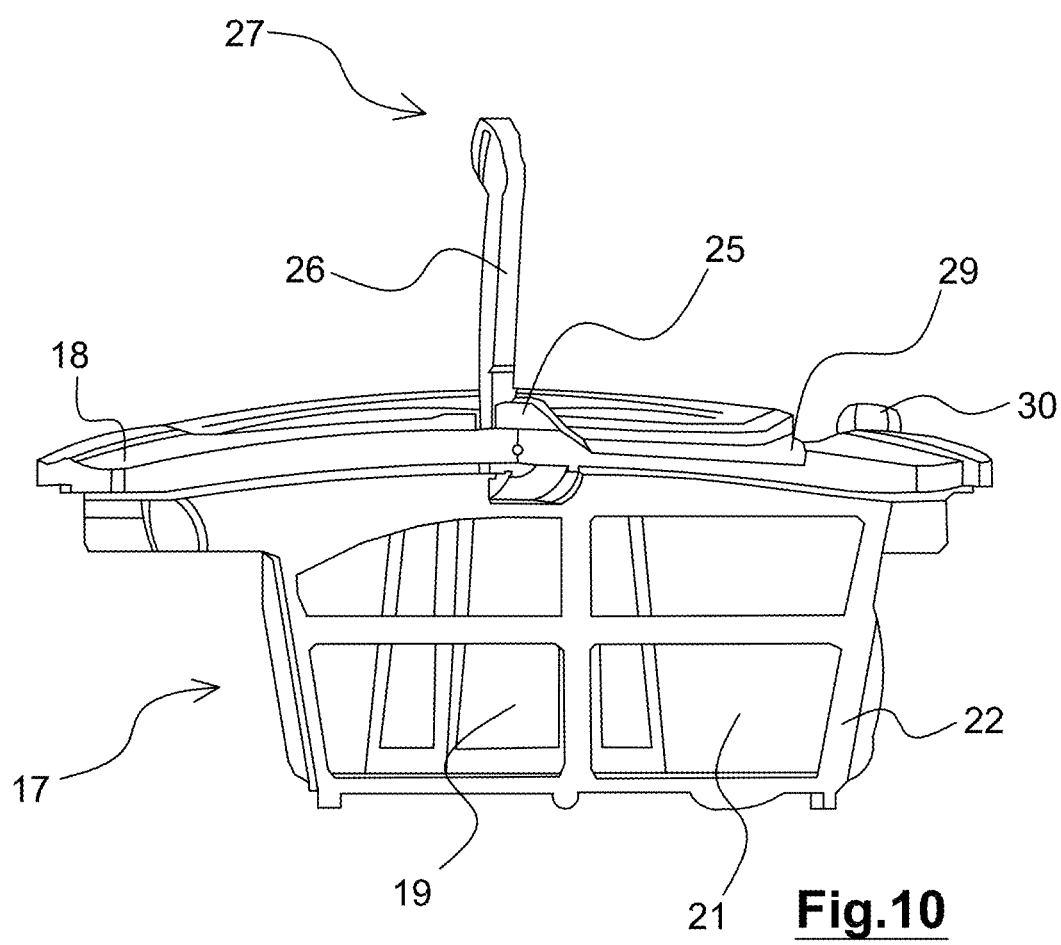
Figure 12:
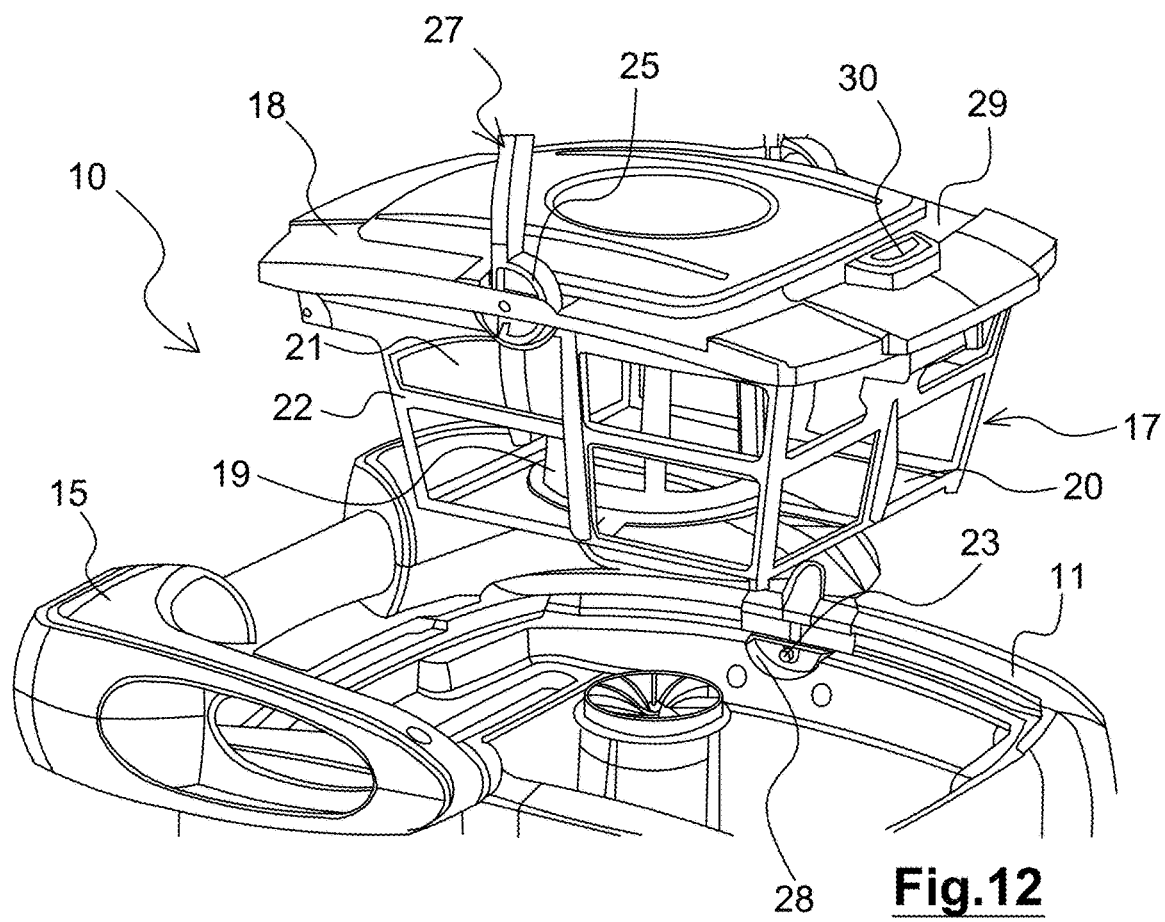
FIG. 12 is an exploded view of the same swimming pool apparatus.

As shown in FIGS. 10 and 12, the cover 18 forms an upper portion of the outer wall of the body 11 of the cleaning unit 10 when the filter basket 17 is inserted in the housing of said cleaning unit. The cover 18 has a shape corresponding to the lateral shape of the filter basket 17, said shape possibly being pierced at its centre in order to provide a passage for the cowling of the axial-flow impeller whose upper end forms the liquid outlet 14.

In the present embodiment shown in FIG. 12 the cover 18 includes locking means on the top of the filter basket 17 in the form of two lugs 23 that can be actuated manually, disposed under the longitudinal edges of said cover 18 (see FIG. 12) and including return means 24. These lugs 23 close over housings in the top longitudinal edges of the rigid armature 22 of the filter basket 17. By way of nonlimiting example, the return means 24 are of the torsion spring type.

As a result, by depressing the two lugs 23 simultaneously, a user separates the filter basket 17 from the cover 18. They can then grasp the rigid armature 22 of the filter basket 17 by its longitudinal edges, for example at the location of the housings corresponding to the lugs 23, and manipulate said filter basket without having to come into contact with the filtration sludge, localized at the level of the filter surface. The user can therefore turn over the filter basket 17, empty it and then wash it in plenty of water, still without coming into contact with the filter sludge.

The cover 18 also includes means for locking it to the body 11 in the form of two lateral slides 25 (see FIGS. 5 and 6) configured in the form of circular arc conduits, these slides 25 being fastened to the arms 26 of an extraction handle 27 mobile between an approximately horizontal position (plane $X_r Y_r$) and an approximately vertical position (plane $Y_r Z_r$). The two lateral slides 25 are disposed one on each side of the cover 18 (see FIGS. 3 and 4).

Figure 11:
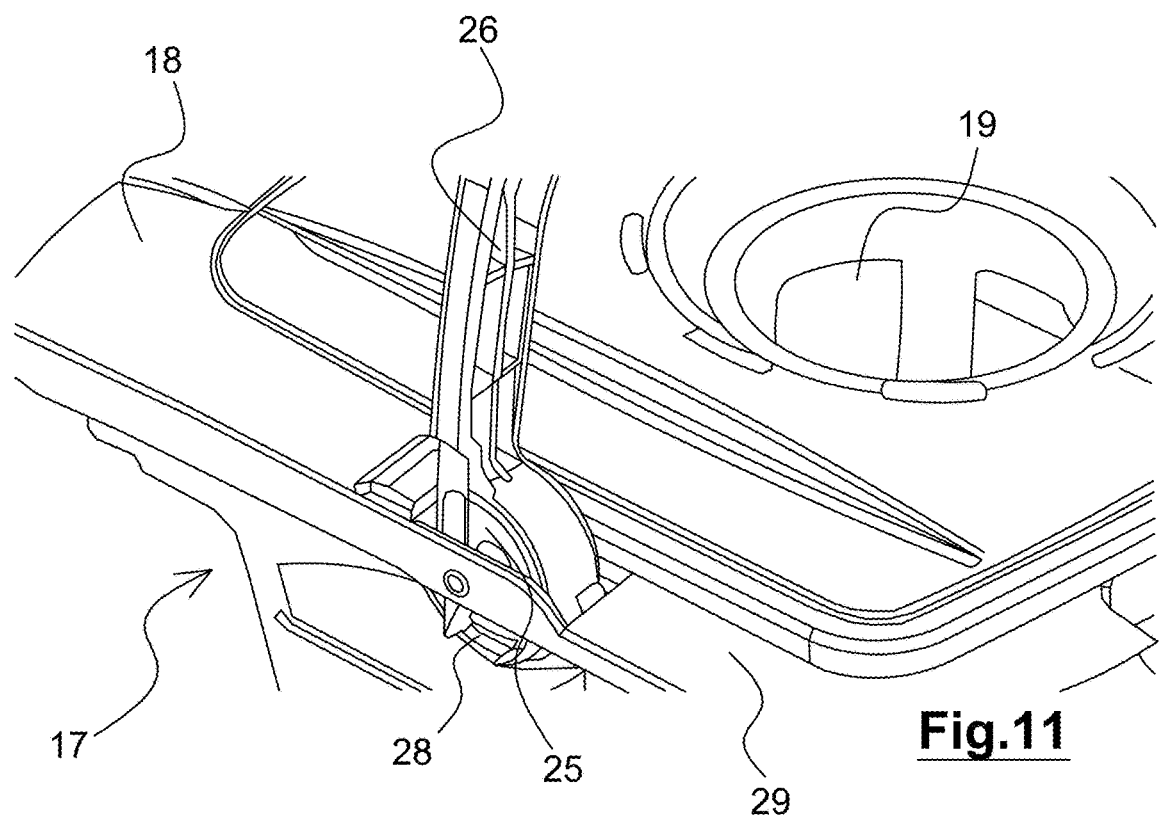
FIG. 11 is a detailed view of the handle on the cover of the same basket.

These two lateral slides 25 cooperate with two semicircular recesses each including a central stud, said recesses being formed in the lateral edges at the top of the body 11. They also correspond to two semi-cylindrical lateral edges 28 of the filter basket 17. As a result, when the cover 18 is disposed on the filter basket 17 and on the body 11, the lateral slides 25 of the cover 18 are positioned on the semi-cylindrical edges 28 of the filter basket 17, coming to bear on the semicircular recesses of the body 11, as can be seen in FIGS. 11 and 12.

Clearly the central stud slides in the circular arc conduit of the corresponding lateral slide 25 and, depending on whether the extraction handle 27 is vertical or horizontal, the central stud is released or locked into the circular arc conduit. The filter chamber 16 comprising the filter basket 17 and the cover 18 is therefore fastened to or released from the body 11 of the cleaning unit 10, depending on whether the extraction handle 27 is horizontal or vertical.

Figure 8:
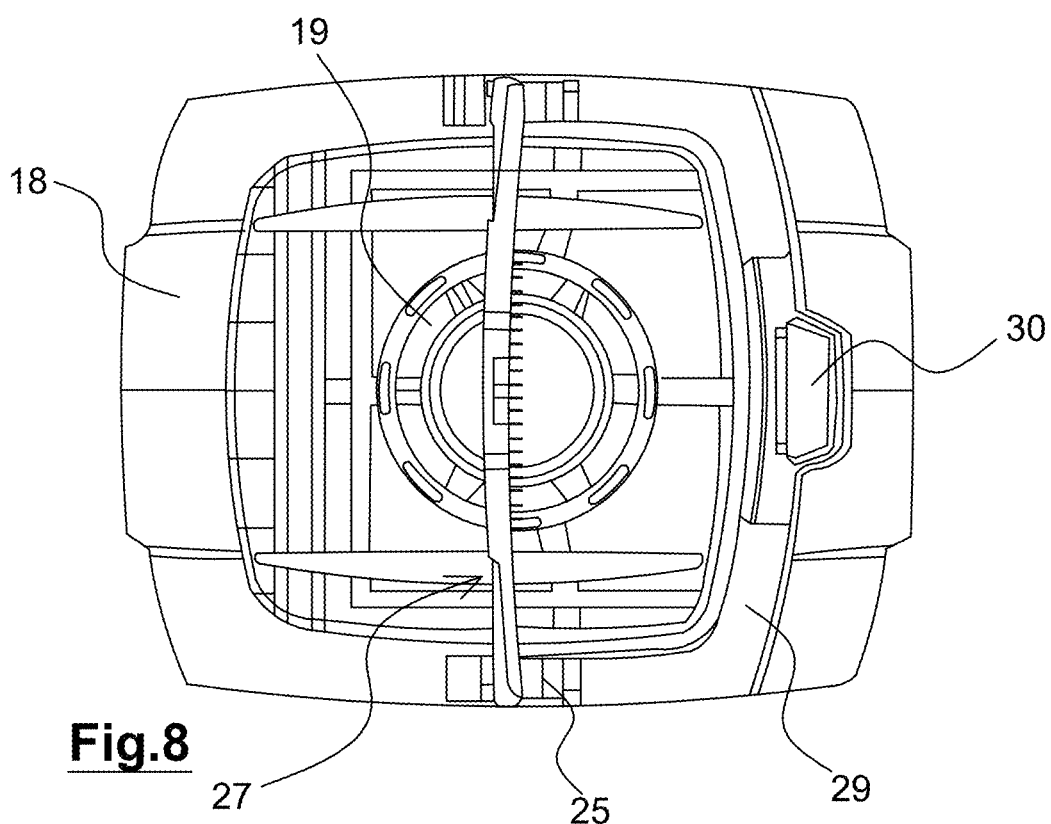

When horizontal, the extraction handle 27 fits in and is at least partially inserted in a recess 29 (see FIGS. 5, 6, 10) provided for this purpose in the upper surface of the cover 17. In this position, the extraction handle 27 is held in place on the cover 18 by a retaining device 30 (see FIGS. 8 and 10). Here this retaining device 30 takes the form of a wide button that can be actuated manually, mobile in rotation about a transverse axis (axis $Y_r$) between a first position and a second position, urged towards the first position by a torsion spring, and a part of the central lower surface of which is then located above a corresponding part of the surface of the extraction handle 27, therefore locking the latter.

A torsion spring (not visible in the figures) is mounted between the cover 18 and the extraction handle 27 at the articulation points of the arms 26 of the extraction handle 27. This torsion spring is configured to urge the extraction handle towards its vertical position, whilst enabling a user of normal strength to push said extraction handle 27 easily towards its horizontal position.

As a result, when the mobile handle 27 is moved to the vertical position, the cover 18 and the filter basket 17 can be removed from the body 11 by the user. The extraction handle 27 is locked by the retaining device 30 on the cover 18 when the filter basket 17 is inserted in the body 11 to prevent any risk of the filter basket 17 moving when the cleaning unit 10 is in operation.

Variants

In a variant embodiment the holding handle 15 is further mobile between a deployed position and a position folded against the body of the cleaning unit.

A torsion spring type return spring on the axis of the holding handle 15 urges the holding handle toward its deployed position. When it is positioned in the folded-away configuration (not shown in the figures), said holding handle 15 is held in place by means for retaining (also not shown) that can be actuated manually.

In a variant embodiment, the extraction handle 27 is mobile between a first position and a second position for any service requirement, for example to change a worn part.

In another variant embodiment the swimming pool cleaning unit 10 comprises an indicator moveable from a first position to a second position, the indicator being visible from outside the body 11 when it is the second position, and means for urging the indicator towards the second position when the debris filter contains a predetermined quantity of debris.

In another variant embodiment the swimming pool cleaning unit 10 comprises a handle moveable from a first position to a second position and means for urging the handle towards the second position, these means being activated for example by a debris filter filling level sensor or by a battery level sensor in the case of a battery-powered cleaning robot. As a result, the high position of the handle is a visual indicator of the need for maintenance of the cleaning unit that is highly visible to the user.

The invention claimed is:

1. A swimming pool cleaning apparatus comprising:
   a. a body;
   b. a debris filter, at least a part of which is disposed inside the body;
   c. an indicator, mobile from a first position to a second position, the indicator being visible from outside the body when in the second position; and
   d. means for urging the indicator toward the second position when the debris filter contains a predetermined quantity of debris.

2. A swimming pool cleaning apparatus according to claim 1 in which the indicator comprises a handle.

3. A swimming pool cleaning apparatus according to claim 1 in which the means for urging comprises a torsion spring.

* * * * *